(12) United States Patent
Horie et al.

(10) Patent No.: US 6,435,996 B2
(45) Date of Patent: Aug. 20, 2002

(54) SILENT CHAIN

(75) Inventors: Hiroshi Horie; Kazumasa Matsuno; Shigekazu Fukuda; Takayuki Funamoto; Yoshinori Iwasaki; Nobuyuki Onoda, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 2 days.

(21) Appl. No.: 09/759,652

(22) Filed: Jan. 12, 2001

(30) Foreign Application Priority Data

Jan. 12, 2000 (JP) ........................................ 2000-003820

(51) Int. Cl.⁷ ........................... F16G 13/02; F16G 13/06
(52) U.S. Cl. ..................... 474/213; 474/212; 474/206
(58) Field of Search .............................. 474/213, 212, 474/229, 157, 201, 214, 211–217, 206; 29/557, 558, 6, 8, 13, 15

(56) References Cited

U.S. PATENT DOCUMENTS

| | | | | |
|---|---|---|---|---|
| 2,722,843 A | * | 11/1955 | Edwards, Jr. .............. | 474/213 |
| 4,915,676 A | * | 4/1990 | Komeya .................... | 474/213 |
| 5,803,854 A | * | 9/1998 | Tada et al. ................ | 474/206 |
| 6,045,473 A | * | 4/2000 | Matsumoto et al. ......... | 474/212 |
| 6,272,835 B1 | * | 8/2001 | Horie et al. ............... | 474/212 |

* cited by examiner

*Primary Examiner*—David A. Bucci
*Assistant Examiner*—Marcus Charles
(74) *Attorney, Agent, or Firm*—Howson & Howson

(57) ABSTRACT

A silent chain for use with a sprocket has a plurality of interleaved rows of link plates connected together in an endless fashion, each link plate having a pair of teeth. Each of the teeth has an inside flank and an outside flank surface merging at a tip of the tooth. The inside flank has a smooth contact surface which is smaller in width than the smooth contact surface of the outside flank surface. The point where the link plate starts to move into contact with the tooth flank of the sprocket is set to locate in an area having the smooth contact surface at a relatively high rate of occupancy. With this arrangement, noise occurring at the mesh between the link plate and the sprocket can be reduced. The point where the meshing engagement completes is set to locate in an area having the smooth contact surface at a relatively high rate of occupancy. This arrangement improves the wear resistance and fatigue strength of the link plate.

9 Claims, 5 Drawing Sheets

TOOTH TIP

FIG. 3
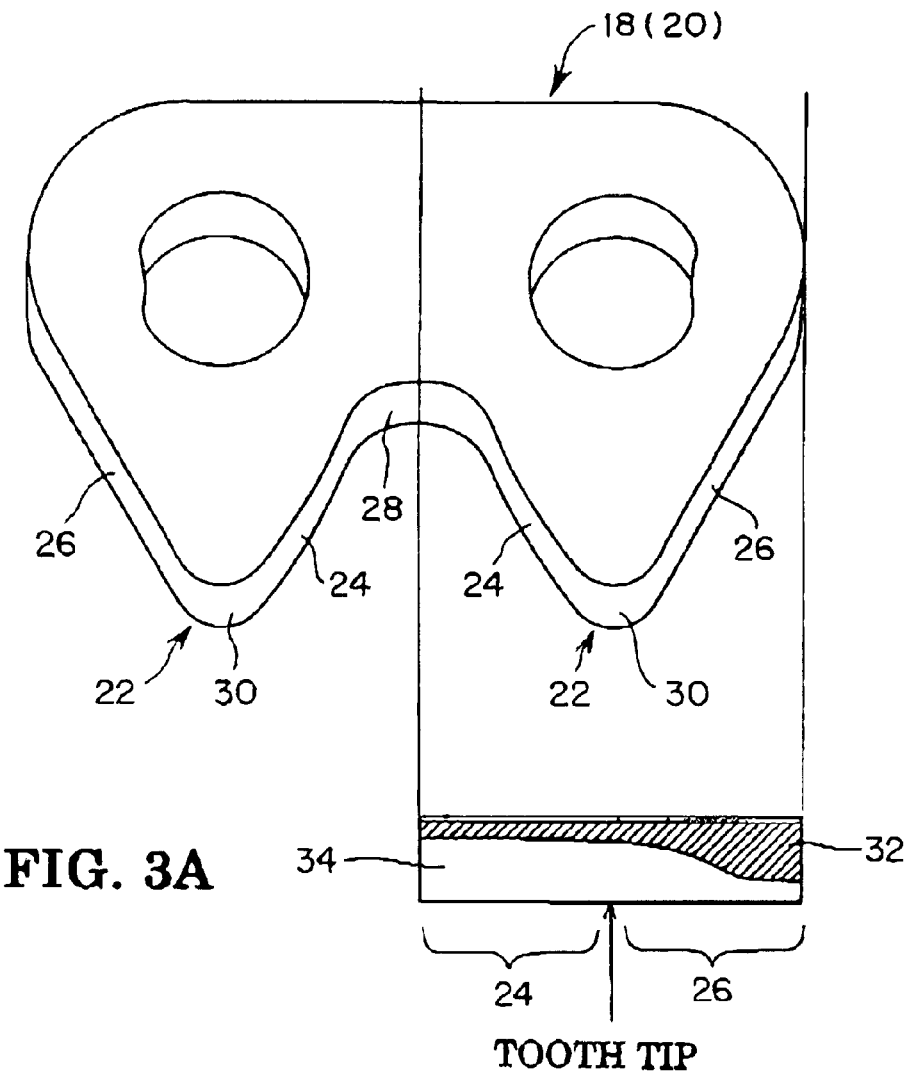
FIG. 3A
FIG. 3B
FIG. 3C
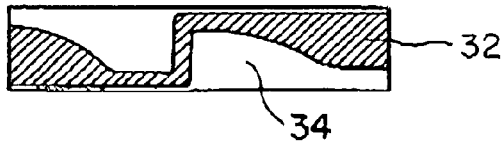
FIG. 3D

SILENT CHAIN

BACKGROUND OF THE INVENTION

The present invention relates to a silent chain used in combination with sprockets, and more particularly to such a silent chain which is capable of reducing noises and wear produced due to meshing engagement between the chain and the sprocket.

Silent chains include guide link rows and intermediate link rows alternately connected together in an endless fashion. In a typical example of such silent chains, the guide link rows each have a pair of guide plates and at least one link plate disposed between the guide plates. The guide plates and the link plate each have a pair of pin holes spaced in the direction of travel of the silent chain. The intermediate link rows each have two or more link plates numbering one more than the number of the link plates in each guide link row. The link plates, like the link plates in the guide rink rows, each have a pair of spaced pin holes.

Each of the guide link rows and an adjacent one of the intermediate link rows are articulately connected together by a connector pin inserted through the laterally aligned pin holes of the link plates and guide plates. The connector pin may be a round pin or a pair of rocker joint pins.

The silent chain is used for transmitting power between a driving sprocket and a driven sprocket through meshing engagement with the sprockets. In a practical application, the silent chain is wound around a crank sprocket and a cam sprocket of an automobile engine, or around the output shaft of an automobile transmission and the input shaft of a transfer unit. Consideration will be first given to the method of producing the link plates and the structure of a surface formed by a punching operation. The link plates are usually formed by punching a metal blank into a desired shape and configuration. In the punching or other blanking operation, a die-cut surface of the link plate unavoidably has a smooth shear surface and a rough rupture surface. According to a conventional design concept, special weight is given to the way of increasing the proportion of the shear surface with a view to improving the strength of the silent chain. This is partly because a high proportion of the rupture surface may cause cracking, and partly because a narrow shear surface results in an increased surface pressure on tooth flanks of the link plate, leading to deterioration of the wear resistance and fatigue strength of the silent chain.

Next, consideration will be given to the behavior of the silent chain at the time of meshing with a sprocket. Regardless of the difference in type of the link rows, meshing starts to occur between flank surfaces of the link plates and tooth flanks of the sprocket. In one type of silent chain, at the point where the silent chain starts to engage the sprocket, an outer flank of one link plate located at the rear side in the travel direction first comes into contact with a tooth of the sprocket. In another type of silent chain, at the point where the silent chain starts to engage the sprocket, an inner flank of one link plate located at the front side in the travel direction first comes into contact with a tooth of the sprocket. In any case, when the silent chain starts to mesh with the sprocket, noises occur due to collision between the flank surface of each link plate and the tooth flank of the sprocket.

As discussed above, the rigidity of the link plate increases with the proportion of the shear surface. However, increasing the proportion of the shear surface will give rise to a problem that collision sounds produced by engagement between the link plates and the sprocket are intensified. In automobile engines and automobile transmission where compatibility of durability and quietness is a major requirement, sufficient consideration must be given to the noise suppressing measure as well as to improvements in strength. Through observations of the dynamic behavior of a silent chain, the present inventors uncovered the fact that the area of the flank surface which takes part in the improvement in the strength of the silent chain is not necessarily the same as the area of the flank which takes part in the emission of noises from the silent chain. Rather, these areas are different from each other. Stated in detail, an area of the outside flank surface of each link plate, which is located near a chain pitch line, receives power from the tooth flanks of the sprocket, and an area at which the link plates start to engage the sprocket is a portion of the inside or the outside flank surface located near the tip of a tooth of the sprocket.

In completing the present invention, account was taken of the fact that, even when the ratio of the shear surface to the rupture surface is differentiated between the area at which a flank surface of each link plate starts to engage the surface of a tooth of the sprocket, and the area at which the flank surface of the same link plate receives power from the surface of the tooth of the sprocket, a sufficient chain strength can be maintained, provided that the power-receiving area has a sufficiently large shear surface.

SUMMARY OF THE INVENTION

It is accordingly an object of the present invention to provide a silent chain which is capable of reducing collision noises occurring between the flank surface of a link plate and the tooth flank of a sprocket when the silent chain starts to engage the sprocket, and also is able to maintain the desired wear resistance and fatigue strength of the link plate after completion of meshing engagement between the silent chain and the sprocket.

According to the present invention, there is provided a silent chain for use with a sprocket, comprising: a plurality of interleaved rows of link plates connected together in an endless fashion, each of the link plates having a pair of teeth, each tooth having a flank surface, a mesh start area at which the tooth starts to mesh with a tooth flank of the sprocket, and a power-transmitting area at which the tooth receives power from the tooth flank of the sprocket. The mesh start area and the power-transmitting area are located at different positions on the flank surface. The mesh start area has a smooth contact surface and a non-contact surface arranged side by side in the direction of thickness of the link plate. The non-contact surface is set back from the smooth contact surface, and the smooth contact surface is smaller in width than the non-contact surface. The power-transmitting area has a smooth contact surface and a non-contact surface arranged side by side in the direction of thickness of the link plate. In the power-transmitting area, the non-contact surface is set back from the smooth contact surface, and the smooth contact surface is greater in width than the non-contact surface.

With this arrangement, when the silent chain starts to engage the sprocket, the inside flank surface or the outside flank surface first moves into contact with the tooth flank of one tooth of the sprocket at a position adjacent to the tooth tip. In the mesh start area at which the inside or outside flank surface start to move into meshing engagement with the tooth flank of the sprocket, the rate of occupancy of the smooth contact surface is relatively low and hence able to reduce collision sound produced between the smooth contact surface and the tooth flank of the sprocket. The mesh start area does not take part in the power-transmitting operation and hence is freed from the problem of wear.

As the silent chain further advances along the periphery of the sprocket, the same tooth flank of the sprocket comes into contact with a different portion of the tooth flank than the portion including the mesh start area. When the silent chain has established complete mesh with the sprocket, the tooth flank of the sprocket is in contact with a power-transmitting area completely different from the mesh start area and thus transmits power to the power-transmitting area. In the power-transmitting area, the occupancy rate of the smooth contact surface is relatively high, so that the power-transmitting area is able to perform a power-transmitting operation without involving undue surface pressure. The power-transmitting area has high wear resistance and fatigue strength, which leads to a long service life of the silent chain.

In one preferred form of the invention, each of the teeth has an inside flank surface and an outside flank surface merging at a tip of the tooth, and the rate of occupancy of the smooth contact surface in the outside flank surface increases gradually in a direction from the tip of the tooth toward a base of the tooth. This arrangement is particularly useful when embodied in a silent chain of the type wherein the mesh start area and the power-transmitting area are both provided on the outside flank surface.

The rate of occupancy of the smooth contact surface in the inside flank surface may be lower than the rate of occupancy of the smooth contact surface in the outside flank surface. This arrangement is particularly useful when applied in a silent chain of the type wherein the inside flank surface first comes into contact with the tooth flank of the sprocket, and the outside flank surface is then engaged in the power-transmitting operation. The inside flank surface, which is not engaged in the power transmitting operation, has the smooth contact surface at a low occupancy rate and, hence, is able to reduce noise and has an improved degree of durability and fatigue strength. The rate of occupancy of the smooth contact surface in the inside flank surface may uniform throughout the length of the inside flank surface, in which instance the smooth contact surface and the non-contact surface in the outside flank surface may be in phase with, or 180° out of phase with, the smooth contact surface and the non-contact surface in the inside flank surface. Alternatively, the rate of occupancy of the smooth contact surface in the inside flank surface may increase gradually in a direction from the tip of the tooth toward the base of the tooth. The smooth contact surface in the outside flank surface may be symmetric to the smooth contact surface in the inside flank surface with respect to the tip of the tooth, in which instance the smooth contact surface and the non-contact surface in the outside flank surface may be in phase with, or 180° out of phase with the smooth contact surface and the non-contact surface in the inside flank surface.

The rate of occupancy of the smooth contact surface in the power-transmitting area may be more than 40%, and preferably more than 70%. The rate of occupancy of the smooth contact surface in the mesh start area is preferably in the range of 7 to 15%.

The link plates in one row and the link plate in another row may have different rates of occupancy of the smooth contact surface. These rows of link plates may be arranged either in a regular pattern or in a random pattern in the longitudinal direction of the silent chain. This arrangement is highly effective in reducing noise caused by resonance of periodic sounds.

Similarly, the link plates in each row may have different rates of occupancy of the smooth contact surface. The link plates with different rates of occupancy of the smooth contact surface may be arranged either regularly or at random in the widthwise direction of the silent chain. This arrangement contributes to the reduction of noise.

BRIEF DESCRIPTION OF THE DRAWINGS

A preferred embodiment of the present invention will now be described in detail, by way of example only, with reference to the accompanying drawings, in which:

FIG. 3 is an enlarged perspective view of a link plate of the silent chain;

FIG. 3A is a bottom view of a portion of the link plate;

FIGS. 3B to 3D are views similar to FIG. 3A, but showing modifications according to the present invention;

DETAILED DESCRIPTION OF THE PREFERRED EMBODIMENT

The following description is merely exemplary in nature and is in no way intended to limit the invention or its application or uses.

Figure 1:
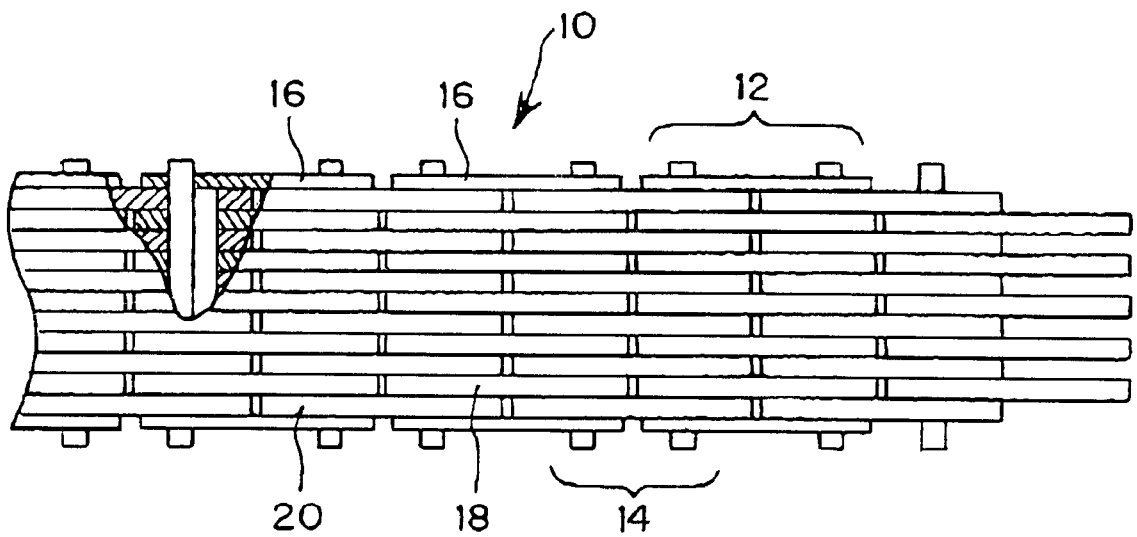
FIG. 1 is a fragmentary plan view, partly in cross section, of a silent chain according to an embodiment of the present invention.
Figure 2:
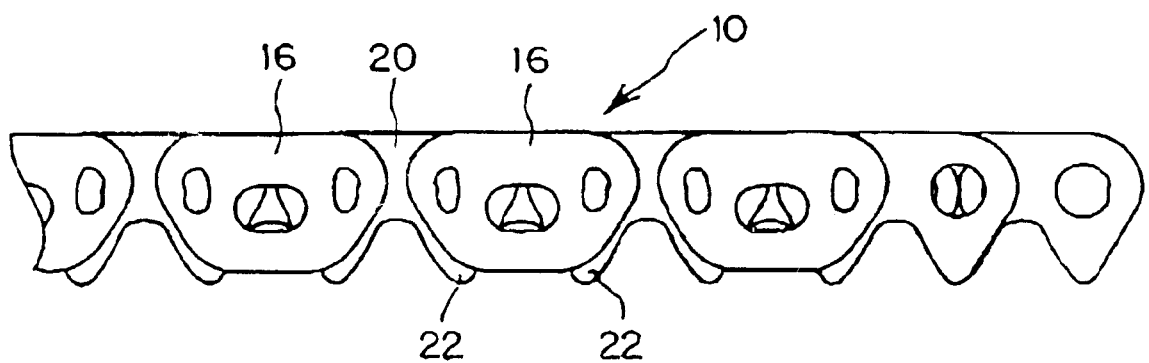
FIG. 2 is a front elevational view of the silent chain.

Referring now to the drawings and FIGS. 1 and 2 in particular, there is shown a silent chain 10 embodying the present invention. The silent chain 10 includes guide link rows 12 and intermediate link rows 14 arranged alternately in the longitudinal direction of the chain and articulately connected together in an endless fashion. The guide link rows 12 each have a pair of guide plates 16 and at least one link plate 18 (five link plates being shown) disposed between the guide plates 16. The guide plates 16 each have a pair of pin holes (not designated) spaced in the longitudinal direction of the chain 10. Similarly, the link plates 18 each have a pair of pin holes (not designated) spaced in the longitudinal direction of the chain 10. The intermediate link rows 14 each have link plates 20 numbering one more than the number of the link plates 20 in each of the guide link rows 12. In the illustrated embodiment, each of the intermediate link rows 14 has six link plates 20. The link plates 20, like the guide and link plates 16 and 18, have a pair of pin holes (not designated) spaced in the longitudinal direction of the chain 10.

The guide plates 16 and the link plates 18 in one guide link row 12 and the link plates 20 in the adjacent intermediate link row 14 are articulately connected together by a connector pin (not designated) inserted through respective pin holes of the plates 16, 18 and 20. The connector pin may be comprised of a cooperating pair of rocker joint pins such as shown in the illustrated embodiment, or a round pin (not shown).

When the silent chain 16 is in mesh with the tooth flanks of a sprocket S (see FIG. 6), the guide plates 16 are guided by the opposite side surfaces of the sprocket S so that the silent chain 10 is prevented from displacing off the sprocket S in a lateral direction. Since each guide link row 12 has a greater number of plates 16, 18 than each intermediate link row 14, the link plates 20 in the intermediate row 14 may be made thicker than the guide plates 16 and link plates 18 of the guide link row 12. As an alternative, the thickness of the guide plates 16 may be reduced. In the illustrated embodiment, the link plates 18 in the guide link rows 12 and the link plates 20 in the intermediate link rows 14 have the same contour or profile.

FIG. 3 is a perspective view showing the link plate 18 (20) of each link row 12 (14). As shown in this figure, one side of the link plate 18 (20) is bifurcated so as to form a pair of spaced teeth 22. Each tooth 22 has an inside flank surface 24 and an outside flank surface 26. The respective inside flank surfaces 24 of the teeth 22 are blended together at a concavely arcuate crotch 28. The inside flank surface 24 and the outside flank surface 26 merge together at a tip 30 of the tooth 22. In a typical silent chain 10 as shown in FIGS. 1 and 2, an area of the outside flank surface 26 of each tooth 22, which is located in and around a outside flank pitch line (not shown), is used for meshing engagement with the tooth flanks of the sprocket S (see FIG. 6) for achieving a power-transmitting operation. The term "outside flank pitch line" used herein represents a line passing parallel to a chain pitch line over the outside flank 26 at points where the distance between these points becomes 3/2 of the chain pitch. The term "chain pitch line" used herein represents a line interconnecting the centers of the pin accommodating holes (not designated) of the link plate.

According to the present invention, the link plate 18 (20) has an outside surface (peripheral surface) configured to have a unique structure, as will be described below. FIG. 3A shows one tooth 22 of the link plate 18 (20) as viewed from the tooth tip 30 side. For purposes of illustration, a smooth contact surface 32 is indicated by hatching. In the illustrated embodiment, in the inside flank surface 24, the rate of occupancy of the smooth contact surface 32 is uniform and smaller than that of a non-contact surface 34. In the outside flank surface 26, the rate of occupancy of the smooth contact surface 32 increases gradually in a direction form the tooth tip 30 toward the outside flank pitch line (namely, toward a base of the tooth 22 shown in FIG. 3). The occupancy rate of the smooth contact surface 32 becomes maximum at an area where the outside flank's surface 26 comes in complete mesh with the tooth flank of the sprocket. The non-contact surface 34 forms a part of the peripheral surface of the link plate 18, 20 excluding the smooth contact surface 32. The non-contact surface 34 is set back from the smooth contact surface 32.

As discussed previously, the link plates 18 (20) are produced by punching out or blanking a metal sheet into a desired shape and configuration. In the punching process, formation of a shear surface and a rupture surface is unavoidable. The shear surface is smooth and hence can be used as the above-mentioned smooth contact surface 32. As an alternative, the shear surface may be subjected to a shaving process to form a smooth contact surface 32. The rupture surface can be used as the above-mentioned non-contact surface 34. By using the shear and rupture surfaces unavoidably formed as a result of the punching operation, it becomes possible to control the occupancy rate or proportion of the smooth contact surface to the inside or the outside flank surface depending on the proportion of the shear surface to the rupture surface.

Figure 4:
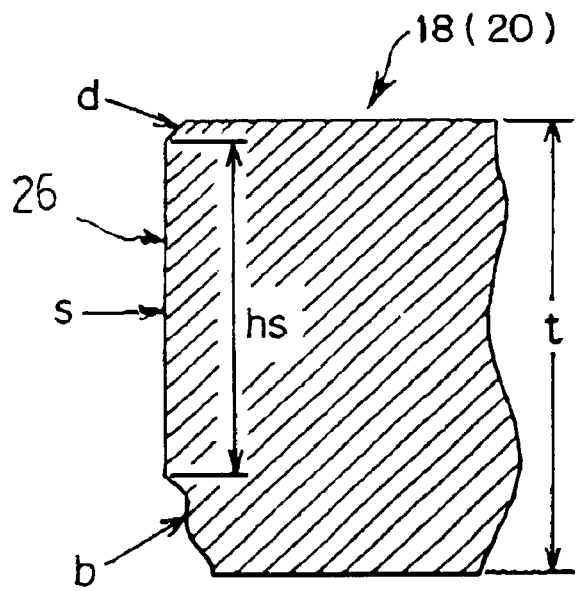
FIG. 4 is a cross-sectional view of a portion the link plate including an area having a relatively large proportion of a smooth contact surface.

FIG. 4 is a cross-sectional view of an area of the outside flank surface 26 which is engaged in the power transmission between the link plate 18 (20) and the sprocket. The power-transmitting area is formed by a shear drop d, a shear surface s and a rupture surface b arranged in the order named as viewed in the punching or die-cutting direction. The occupancy rate of the shear surface (smooth contact surface) s, which is represented by the ratio of the shear length (length of the shear surface s) hs to the thickness t of the link plate 18 (20), is above 40%. It is desirable that the occupancy rate of the smooth contact surface (shear surface s) be as high as possible, and preferably more than 70%.

Figure 5:
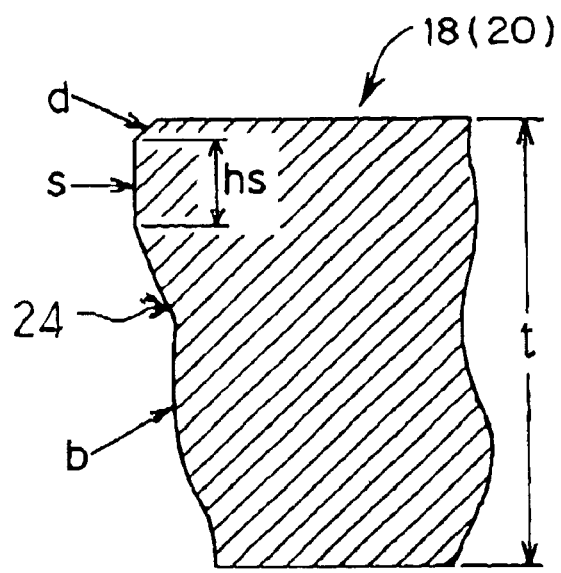
FIG. 5 is a cross-sectional view of a portion the link plate including an area having a relatively small proportion of the smooth contact surface.

FIG. 5 is a cross-sectional view of an area of the inside flank surface 26 at which the link plate 18 (29) first starts to mesh with a tooth flank of the sprocket. It is to be noted however that in another type of silent chain, the outside flank surface 26 (FIG. 3) first starts to come into meshing engagement with the tooth flank of the sprocket. In the latter case, the outside flank surface 26 is configured to have the same area as shown in FIG. 5. The mesh start area shown in FIG. 5 is formed by a shear drop d, a shear surface s and a rupture surface b arranged in the order named as viewed in the punching or die-cutting direction. The rate of occupancy of the shear surface s (smooth contact surface 32), which is represented by the ratio of the shear length hs to the thickness t of the link plate 18 (20), is in the range of 7 to 15%.

Turning back to FIGS. 3B, 3C and 3D, there are shown modifications according to the present invention.

In the first modification shown in FIG. 3B, the occupancy rate of the smooth contact surface 32 in the inside flank surface 24 increases gradually in a direction from the tooth tip 30 (see FIG. 3) toward an inside flank pitch line side (namely, toward the crotch 28 shown in FIG. 3). The smooth contact surface 32 in the inside flank surface 24 and the smooth contact surface 32 in the outside flanks surface 26 vary symmetrically with each other about the tooth tip 30 (FIG. 3). Since the occupancy rate of the smooth contact surface 32 is made maximum at the crotch 28, the crotch 28 is highly resistant to cracking.

In the modification shown in FIG. 3C, the positional relation established in the outside flank surface 26 (see FIG. 3A) between the smooth contact surface 32 and the non-contact surface 34 is reversed in the inside flank surface 24 (see FIG. 3A). The inside and outside flank surfaces 24, 26 of the link plate can be produced by a two-stage punching process. In the first punching stage, the outside flank surface 26 and the tooth tip 30 are punched out in one direction from the top to the bottom of FIG. 3C, and in the second or subsequent punching stage, the tooth tip 30 and the inside flank surface 24 are punched out in the opposite direction from the bottom to the top of FIG. 3C.

In the modification shown in FIG. 3D, the smooth contact surface 32 in the outside flank surface 26 (see FIG. 3A) is nearly 180° out of phase with the smooth contact surface 32 in the inside flank surface 24 (see FIG. 3A). The link plate with inside and outside flank surfaces shown in FIG. 3D, like the one shown in FIG. 3C, can be produced by the two-stage punching process. In the first punching stage, the outside flank surface 26 and the tooth tip 30 are punched out in one direction from the top to the bottom of FIG. 3D, and in the second or subsequent punching stage, the tooth tip 30 and the inside flank surface 24 are punched out in the opposite direction from the bottom to the top of FIG. 3D. In the inside flank surface 24, the occupancy rate of the smooth contact surface 32 increases gradually in a direction from the tooth tip 30 toward the crotch 28 (see FIG. 3). Thus, the crotch 28 is highly resistant to cracking.

Figure 6:
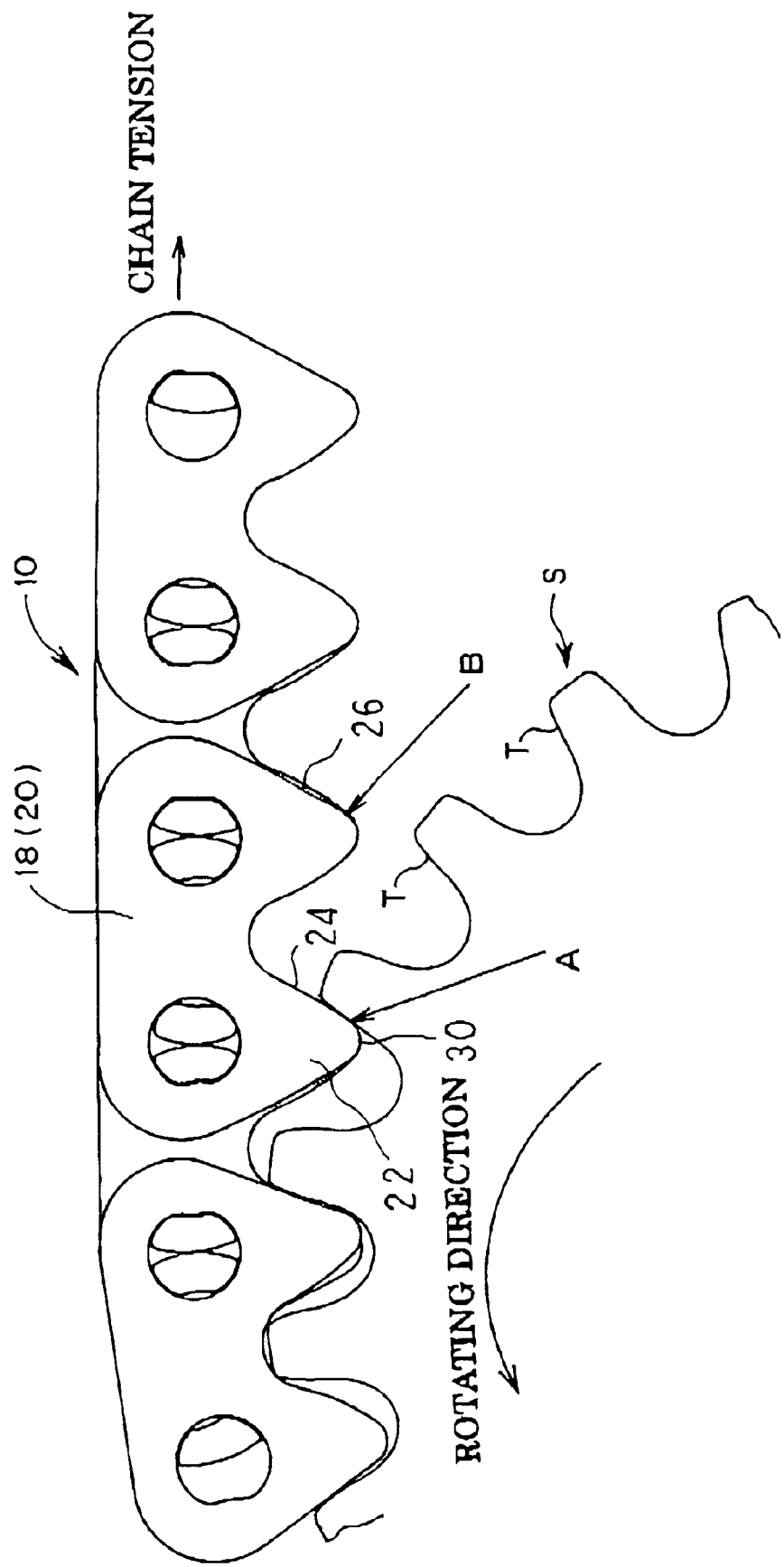
FIG. 6 is a diagrammatical view showing the manner in which one link plate of the silent chain starts to engage with a sprocket.
Figure 7:
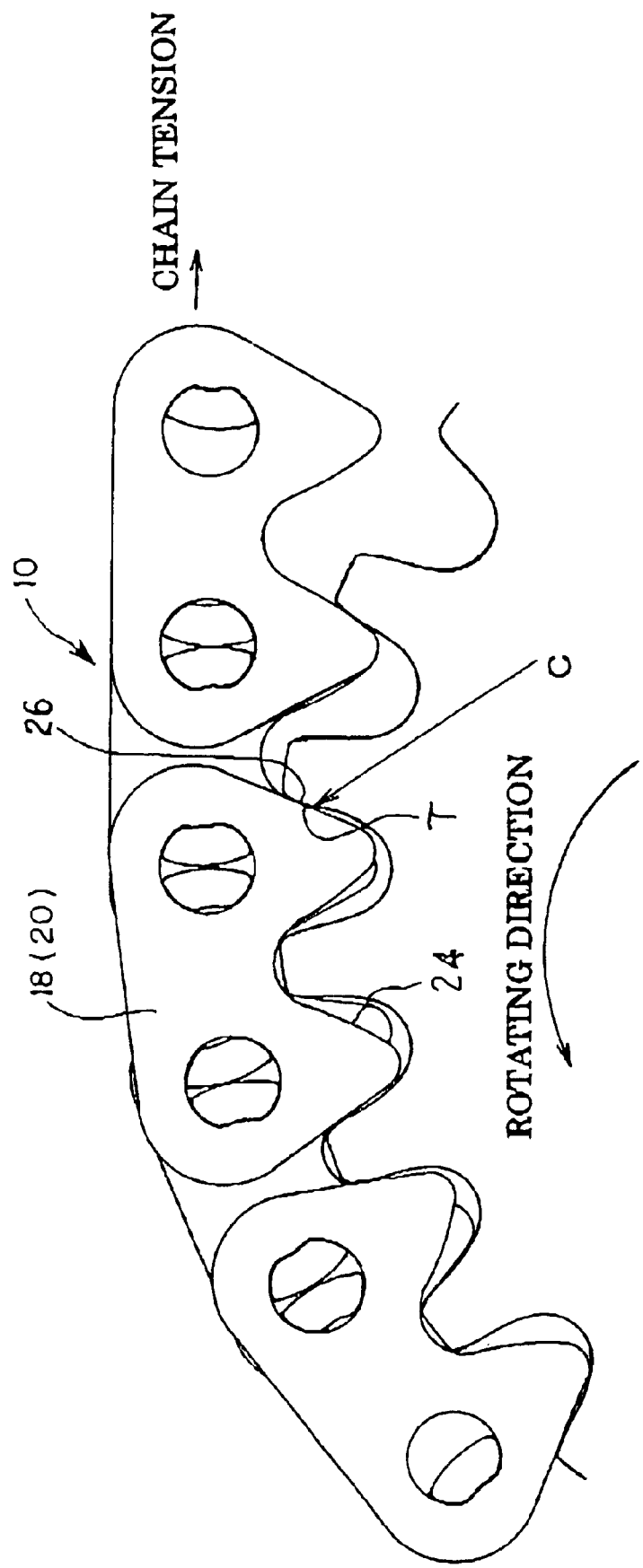
FIG. 7 is a diagrammatical view illustrative of the condition in which the link plate has completed engagement with the sprocket.

FIGS. 6 and 7 show the state of meshing engagement between the silent chain 10 and a sprocket S wherein link plates 18 (20) used to form the silent chain 10 have inside and outside flank surfaces 24, 26 shown in FIG. 3A. For purposes of illustration, the description given below with reference to FIGS. 6 and 7 will be limited to the behavior of only one link plate designated by 18 (20).

First, at the point A which is located near the tooth tip 30, the tooth flank T of each tooth of the sprocket S starts to mesh with the inside flank surface 24 of one tooth 22 located at the front side in the travel direction of the chain 10. It is to be noted however that in another type of silent chain, meshing engagement starts at the point B, which is located on the outside flank surface 26 adjacent the tooth tip 30. In any case, in an area (hereinafter referred to as "mesh start area") of the inside or outside flank surface 24 or 26 including the point A or the point B, the occupancy rate of the smooth contact surface 32 (FIGS. 3A–3D) is made relatively low. By thus starting the meshing engagement between the sprocket S and the link plate 18 (20) at the mesh start area having a relatively low occupancy rate of the smooth contact surface 32, noise occurring at the collision between the link plate 18 (20) and the sprocket S can be reduced to a greater extent. In this instance, since the tooth flank T of the sprocket S has a pressure surface inclined toward the rear side in the chain travel direction, the mesh start area contributes little to the transmission of power. Thus, the engagement start area is freed from the problem of wear and fatigue.

As the silent chain 10 further advances around the sprocket S, the tooth flank T of the next tooth of the sprocket S, as shown in FIG. 7, comes into mesh with the outside flank surface 26 of the other tooth 22 located at the rear side in the travel direction and thus transmits power to the outside flank surface 26 at the point C which is located in and around the outside flank pitch line. The area (herein referred to as the "power-transmitting area") of the outside flank surface 26 including the point C has a smooth contact surface at a high occupancy rate, as shown in FIG. 3A, and hence the surface pressure on the power-transmitting area is relatively low. Thus, power-transmitting area of the outside flank surface 26 has a high wear resistance. In this instance, the tooth flank T of the sprocket S is held out of contact with the mesh start area of the inside flank surface 24. Accordingly, no consideration need be given to wear and fatigue of the mesh start area even though the occupancy rate of the smooth contact surface 32 is relatively low in the mesh start area.

It is preferable that plural different sorts of link plates are prepared and the link plates are then arranged either at random or in a predetermined pattern to assemble a silent chain.

For instance, link plates 18 (FIG. 1) in each guide link row 12 may be designed to have a mesh start area including a smooth contact surface 32 (FIGS. 3A to 3D) at a occupancy rate of 7%, and link plates 20 (FIG. 1) in each intermediate link row 14 may be designed to have a mesh start area including the smooth contact surface 32 (FIGS. 3A to 3D) at a occupancy rate of 15%. By using the link plates 18, 20 of different smooth contact surface occupancy rates, it becomes possible to prevent the resonance of periodic noises, and thereby suppress magnification of the noise.

Alternatively, the link plates 18, 20, differentiated from each other by the occupancy rate of their smooth contact surfaces 32, may be arranged in a random order in the longitudinal direction of the silent chain. This arrangement can also suppress noises caused by resonance.

Furthermore, link plates 18, 20 with different smooth contact surface occupancy rates either may be arranged in each individual link row (guide link row 12 or intermediate link row 14) either in a regular pattern or in a random pattern. This arrangement also contributes to the reduction of noise caused by resonance.

Obviously, various minor changes and modifications of the present invention are possible in the light of the above teaching. It is therefore to be understood that within the scope of the appended claims, the present invention may be practiced otherwise than as specifically described.

What is claimed is:

1. A silent chain for use with a sprocket, comprising:
a plurality of interleaved rows of link plates connected together in an endless fashion, each of the link plates having a pair of teeth, each tooth having a flank surface, a mesh start area at which the tooth starts to mesh with a tooth flank of the sprocket, and a power-transmitting area at which the tooth receives power from the tooth flank of the sprocket, the mesh start area and the power-transmitting area being located at different positions on the flank surface;
the mesh start area having a smooth contact surface and a non-contact surface arranged side by side in the direction of thickness of the link plate, the non-contact surface being set back from the smooth contact surface, the smooth contact surface being smaller in width than the non-contact surface; and
the power-transmitting area having a smooth contact surface and a non-contact surface arranged side by side in the direction of thickness of the link plate, the non-contact surface in the power-transmitting area being set back from the smooth contact surface of the power-transmitting area, the smooth contact surface of the power-transmitting area being greater in width than the non-contact surface of the power-transmitting area;
wherein each of the teeth has an inside flank surface and an outside flank surface merging at a tip of the tooth, and the rate of occupancy of the smooth contact surface in the outside flank surface increases gradually in a direction from the tip of the tooth toward a base of the tooth.

2. A silent chain according to claim 1, wherein the rate of occupancy of the smooth contact surface in the inside flank surface is lower than the rate of occupancy of the smooth contact surface in the outside flank surface.

3. A silent chain according to claim 2, wherein the rate of occupancy of the smooth contact surface in the inside flank surface is uniform throughout the length of the inside flank surface.

4. A silent chain according to claim 3, wherein the smooth contact surface and the non-contact surface in the outside flank surface are in phase with the smooth contact surface and the non-contact surface in the inside flank surface.

5. A silent chain according to claim 3, wherein the smooth contact surface and the non-contact surface in the outside flank surface are 180 degrees out of phase with the smooth contact surface and the non-contact surface in the inside flank surface.

6. A silent chain according to claim 1, wherein the rate of occupancy of the smooth contact surface in the inside flank surface increases gradually in a direction from the tip of the tooth toward the base of the tooth.

7. A silent chain according to claim 6, wherein the smooth contact surface in the outside flank surface is symmetric to the smooth contact surface in the inside flank surface with respect to the tip of the tooth.

8. A silent chain according to claim 7, wherein the smooth contact surface and the non-contact surface in the outside flank surface are in phase with the smooth contact surface and the non-contact surface in the inside flank surface.

9. A silent chain according to claim 7, wherein the smooth contact surface and the non-contact surface in the outside flank surface are 180 degrees out of phase with the smooth contact surface and the non-contact surface in the inside flank surface.

* * * * *